(12) United States Patent
Maeda

(10) Patent No.: US 7,339,875 B2
(45) Date of Patent: Mar. 4, 2008

(54) INFORMATION STORAGE MEDIUM, PLAYBACK AND RECORDING METHOD

(75) Inventor: Takeshi Maeda, Koganei (JP)

(73) Assignee: Hitachi, Ltd., Tokyo (JP)

( * ) Notice: Subject to any disclaimer, the term of this patent is extended or adjusted under 35 U.S.C. 154(b) by 585 days.

(21) Appl. No.: 10/773,411

(22) Filed: Feb. 9, 2004

(65) Prior Publication Data

US 2005/0099931 A1 May 12, 2005

(30) Foreign Application Priority Data

Nov. 6, 2003 (JP) ............................. 2003-376384

(51) Int. Cl.
*G11B 7/00* (2006.01)
(52) U.S. Cl. .................... 369/111; 369/275.4
(58) Field of Classification Search ............. 369/275.4, 369/111
See application file for complete search history.

(56) References Cited

U.S. PATENT DOCUMENTS 5,553,051 A * 9/1996 Sugiyama et al. ..... 369/109.02
6,545,965 B1 * 4/2003 Hayashi .................... 369/59.12
2002/0110080 A1 * 8/2002 Tanaka et al. ........... 369/275.4
2003/0218955 A1 * 11/2003 Isshiki et al. ............ 369/59.21
2004/0252623 A1 * 12/2004 Van Kesteren ........... 369/275.4

FOREIGN PATENT DOCUMENTS

JP 8-31015 7/1994
WO WO 03034412 A2 * 4/2003

OTHER PUBLICATIONS

Wim M.J. Coene, "Two Dimensional Optical Storage", Optical Data Storage 2003, Technical Digest TuB1, pp. 90-92.

* cited by examiner

*Primary Examiner*—Wayne Young
*Assistant Examiner*—LaTanya Bibbins
(74) *Attorney, Agent, or Firm*—Reed Smith LLP; Stanley P. Fisher, Esq.; Juan Carlos A. Marquez, Esq.

(57) ABSTRACT

An information storage medium includes a substrate forming a first groove having a depth, and a second groove adjacent to the first groove and different depth from the first groove; and a recording layer formed on the substrate to record information marks, making optical characteristics of the information marks different for each such that diffracted lights from the plurality of marks orthogonally intersect one another.

3 Claims, 17 Drawing Sheets

INFORMATION STORAGE MEDIUM, PLAYBACK AND RECORDING METHOD

CROSS-REFERENCE TO RELATED APPLICATION

This application relates to and claims priority from Japanese patent Application No. 2003-376384, filed on Nov. 6, 2003, the entire disclosure of which is incorporated herein by reference.

BACKGROUND OF THE INVENTION

1. Field of the Invention

This invention relates to an information storage medium capable of reading out or recording information by irradiating energy beams, and an information playback method and an information recording method each using the medium.

2. Description of the Related Art

To improve a storage capacity in an ROM type optical disk, there has been proposed that a plurality of marks are arranged inside a spot and that a readout signal level is changed to multi-levels in accordance with the number of marks. For example, literature "Two-Dimensional Optical Storage", Optical Data Storage 2003, Technical Digest TuB1 pages 90-92, discloses a structure in which one pit having a perfect circle shape is disposed at a center and six pits are arranged around the center pit. According to the structure, user data is converted to the number of marks and is recorded. At a time of the readout, the number of marks is detected by use of a correspondence relation between the number of marks and reflected light intensity level, and is then returned to the original user data.

JP-A-8-031015 discloses a technology that uses a plurality of phase pits having different depths, provides an optical phase difference between the adjacent pits, and linearizes non-linearity of readout signal levels.

In the ROM described above, the pit interval becomes remarkably narrower in comparison with that in the conventional two-level recording system. Therefore, interference between the pits becomes remarkably strong. When the number of marks is increased, a change of quantity in one pit is not certain, and when the number of marks is great, the change of quantity becomes zero. In other words, the relation between the number of pits and the readout signal level is not linear. When linearity is lost, it becomes difficult to detect the number of pit from the readout signal level, and a detection error increases at a point at which the change of quantity in one pit is small.

JP-A-8-031015 also discloses the phase pit depths in the combinations of ($\pi/2$, $3\pi/2$), ($4\pi/3$, $8\pi/3$) and ($2\pi/3$, $4\pi/3$), but cannot cope with high density recording.

SUMMARY OF THE INVENTION

It is therefore an object of the invention to provide an information recording method and an information recording device each using an optical disk that makes the changes of readout signals substantially equal with respect to the increase/decrease of the number of pits when a plurality of pits exist inside a spot and capable of improving a recording density and correct recording.

The object of the invention described above can be accomplished by the following constructions.

Diffractions from respective marks inside a spot interfere with one another on an objective lens surface. Therefore, when this interference is eliminated, influences become only those from the diffractions of the respective marks, and the readout signal level can be changed uniformly with respect to the increase/decrease of the number of marks.

More specifically, the recording or readout may be conducted to or from a medium including a substrate on which a groove having a first depth and a second groove having a different depth from the first depth are formed adjacent to one another and a recording layer for recording information marks, formed on the substrate, the information marks recorded on the first and second grooves having optical characteristics satisfying the following relations when a relative amplitude of reflectivity of the recorded mark (reference reflectivity: reflectivity of non-recorded part) is r and optical phase differences of the marks of the first and second grooves are $\phi_1$ and $\phi_2$, respectively: $2n\pi=\phi_1+\phi_2$ (where n: an integer) $1-2 \cdot r \cdot \cos(\phi_1)+r^2 \cdot \cos(2 \cdot \phi_1)=0$ The principle of the structure will be hereinafter explained. In a readout system of an optical disk, first, readout signals will be explained when two pits are adjacent to each other. FIG. 1 shows the principle of detecting a signal from an isolated mark 2. The spot 1 is irradiated to the mark 2. It will be assumed that when diffracted light passes through an objective lens 3, a complex amplitude of the diffracted light from the mark in the (x, y) coordinates on the objective lens surface is A(x, y). The signal is proportional to the intensity of the diffracted light passing through the objective lens. In the case of the detection in a reflection type optical disk, the signal is expressed by the expression (1) shown in FIG. 1.

Next, the readout signals from two marks will be considered with reference to FIG. 2. It will be assumed that the two marks exist on the disk surface and the complex amplitudes of the diffraction from the respective marks on the objective lens surface are A(x, y) and B(x, y). Then, the detection signal corresponds to the intensity of light on the objective lens surface in the same way as in FIG. 1 and is expressed by the expression (2) shown in FIG. 2.

When this expression (2) is compared with the expression (1), a different component exists in the readout signal unlike the case where each mark exists in isolation. The component cannot be expressed by a simple sum. When the component can be expressed by the simple sum, it means that linearity is established and the component is referred to as a "linear component". Other components are referred to as "non-linear components" in the sense that they do not have linearity. The existence of this component is a cause that invites distortion of the readout signals from the ROM pits in the conventional technique. The non-linear component hardly exists when the mark interval is large in comparison with the spot diameter. When the mark interval becomes narrow and is from about a half to ¼ of the spot diameter, the non-linear component drastically increases. This component is a component of mutual interference between diffracted light from the mark A and the diffracted light from the mark B as can be understood from the expression (2). The non-linear component can be reduced when this mutual interference can be reduced. One of the methods of reducing the interference orthogonalizes the phases of respective diffracted light.

The phase of diffracted light includes a term determined by the shape of the mark and a term determined by a relative distance between the mark position and the spot. But, because the term determined by the relative position cannot be operated, the orthogonal relation may be established through the term that is determined by the shapes of the respective marks.

The mark shape determining the phase of diffracted light is the characteristics that provide a two-dimensional scale and an optical phase change, for example, the depth of the mark and the relative amplitude of reflectivity. Assuming that the mark is a rectangle having a length L and a width W, the optical phase change is θ and the complex amplitude of reflectivity of the mark is r, the phase term of diffracted light associated with the mark shape is proportional to the following:

$$LW(1-r\exp(j\theta)) \quad (3)$$

Here, the amplitude of reflectivity when the mark does not exist is assumed to be 1.

It can be first understood from the expression (3) that in order to reduce the interference, the coefficients expressed by L and W must be made equal. In other words, the two-dimensional shape of each mark must be equal. Next, the complex number of the rear term of the expression (3) will be examined. To have the explanation easily understood, the examination will be made on the complex plane shown in FIG. 3. FIG. 3 shows the characteristics and the condition of orthogonality of the mark. The real axis is set to a perpendicular direction to the sheet of the drawing and the imaginary axis, to a horizontal direction. In the rear term, "1" represents the complex number of the reflection surface devoid of the mark and assumes the real number 1. "r exp(jθ)" in the rear term represents the complex amplitude of the mark portion. The diffracted light component is the difference of the two components described above. Arrows are allocated to each term and to the diffracted light component to represent them as vectors. In the drawing, reference numeral 300 denotes a vector on an non-recorded surface of readout, 301 denotes a vector of a recorded mark 1 and 302 denotes a vector of a recorded mark 2 adjacent to the recorded mark 1. Vectors representing diffracted light can be created for other marks but to eliminate the interference, they must be orthogonal to the vector representing diffracted light. In other words, the vector representing each diffracted light component must exist on a dotted line. Further, to make signal intensities from the marks equal, the size of the vectors representing respective diffracted light must be equal. The circle shown in FIG. 3 represents the distal ends of the vectors having equal amplitude of reflectivity and the value is 1 in the case of the ROM. An arbitrary value can be taken in the storage medium. For example, when the value is greater than 1, there may be the case where the orthogonal relation between the vectors 100 and 102 can be satisfied. When the condition in which the orthogonal relation is generally established is determined, two diffraction vectors must exist on an extension of dotted line of the vectors 100 and 102.

Therefore, when the amplitudes of reflectivity of the recorded marks are r1 and r2 and the optical phase differences of the recorded marks 1 and 2 are φ1 and φ2, respectively, the orthogonal condition is given by:

$$1-r1\cos(\phi1)-r2\cos(\phi2)+r1\cdot r2\cos(\phi1-\phi2)=0 \quad (4)$$

To make the intensities of diffracted light from the respective recorded marks equal, r1 and r2 must be equal, and $$2n\pi=\phi1+\phi2 \text{ (where: } n \text{ is an integer)} \quad (5)$$

In addition, from the orthogonal relation, r (=r1=r2) and φ1 must satisfy the following expression:

$$1-2\cdot r\cdot\cos(\phi1)+r^2\cdot\cos(2\cdot\phi1)=0 \quad (6)$$

When the orthogonality is established, whether or not linearity is established is confirmed. When only the mark A exists, the signal component resulting from the diffracted light component of the mark A is the balance obtained by subtracting 1 from the total of the detection signals from FIG. 1. When the coefficients relating to the two-dimensional shape of each mark are α and β, respectively, the signal from the mark A is given by:

$$-1+(1+\alpha(1-r1\cos[\phi1])^2+r1^2\alpha^2\sin[\phi1] \quad (7)$$

The signal from the mark B is given by:

$$-1+(1+\beta(1-r2\cos[\phi2])^2+r2^2 2\beta^2\sin[\phi2] \quad (8)$$

Furthermore, the detection signals from A and B, that is, the signal components resulting from the diffracted light components of the marks A and B, are the balance obtained by subtracting 1 from the whole detection signals from FIG. 2 and can be therefore expressed as follows:

$$-1+(1+\alpha(1-r1\cos(\phi1))+\beta(1-r2\cos(\phi2))^2+(r1\alpha\sin(\phi1)+r2\beta\sin(\phi2))^2) \quad (9)$$

Therefore, the non-linear component is given by the following expression by subtracting the terms of the expressions (7) and (8) from the expression (8):

$$2\alpha\beta(1-r1\cos(\phi1)-r2\cos(\phi2)+r1\cdot r2\cos(\phi1-\phi2) \quad (10)$$

It can be understood that when the expression (4) as the orthogonal condition is satisfied, the non-linear component becomes zero irrespective of the mark shape and linearity is established. It can also be understood that the non-linear component is proportional to the sizes of the two mark shapes and is also proportional to deviation from the orthogonal condition.

When the intensity of diffracted light from the recorded marks is rendered equal, the non-linear component can be given by the following expression with α=β:

$$2\alpha^2(1-2r\cos[\phi1]+r^2\cos[2\phi1]) \quad (11)$$

Therefore, the non-linear component becomes zero when the orthogonal condition satisfying the expression (6) is satisfied.

JP-A-8-031015 mentioned above proposes to select the phase pit depth of the ROM to (π/2, 3π/2). This reference has its feature in that "the minimum interval between the adjacent phase pits is substantially the half of the optical spot diameter, the phase pit has a plurality of kinds of phase pits having mutually different depths, and the depth of each phase pit is set to be 50% or more of the readout signal level having a signal intensity that is obtained for each pit and has a difference of 100% between the reflected light level from the reflective layer and the blackout level when the optical spot scans the arrangement of the phase pits." The reference technology is directed to acquire a greater signal quantity per pit by securing a greater pit interval. Therefore, the number of pits entering one spot is at most about 4. In contrast, the present invention decreases the signal quantity per pit, linearizes the relation between the number of pits and the signal change of quantity to enlarge the linear range and allows a greater number of pits to enter the linear range.

When the orthogonal condition is satisfied, the signal components become linear irrespective of the sizes of the two-dimensional shapes of the marks as can be understood from the expression (11) and the pit diameter (mark shape) can be selected arbitrarily. In the conventional example, the signal change quantity of one pit is limited to at least 50% of the total reflected light reflectivity and the number of pits entering the spot is limited to 4. In the invention, the signal change quantity of the mark is set to 50% or less of the total reflected light intensity and 4 or more pits (marks) are allowed to enter the spot. Consequently, the number of bits of the user bit capable of coping with the number of marks increases in a multi-value readout and the capacity per unit area can be improved.

The non-linear component becomes zero irrespective of the two-dimensional shapes of the marks provided that orthogonality is satisfied as can be understood from the expression (10). Therefore, even when the shapes of the two marks are changed independently and freely to change the respective signal intensities, the signal intensities of the two marks do not interfere with each other and the detection signals from the two marks can be expressed by the simple addition. This represents that the system for recording and playing back the information to and from the optical disk becomes the linear system and the signal transmission means that has been used in the past in the information communication systems can be applied.

When the orthogonal condition is satisfied, the signal components become linear irrespective of the sizes of the two-dimensional shapes of the marks as can be understood from the expression (10) and the pit diameter (mark shape) can be selected arbitrarily. In the conventional example, the signal change quantity of one pit is limited to at least 50% of the total reflected light intensity and the number of pits entering the spot is limited to 4. In the invention, the signal change quantity of the mark is set to 50% or less of the total reflected light intensity and 4 or more pits (marks) are allowed to enter the spot. Consequently, the number of bits of the user bit capable of coping with the number of marks increases in a multi-value readout and the capacity per unit area can be improved.

Because the readout signal becomes linear as described above, the invention can be applied to multi-value recording and playback.

The invention can make the relation between the number of pits and the readout signal level linear, is effective for achieving a high density and can acquire readout signals having high reliability.

Other objects, features and advantages of the invention will become apparent from the following description of the embodiments of the invention taken in conjunction with the accompanying drawings.

DETAILED DESCRIPTION OF THE EMBODIMENTS

Next, embodiments of the invention will be explained.

Embodiment 1

Figure 4:
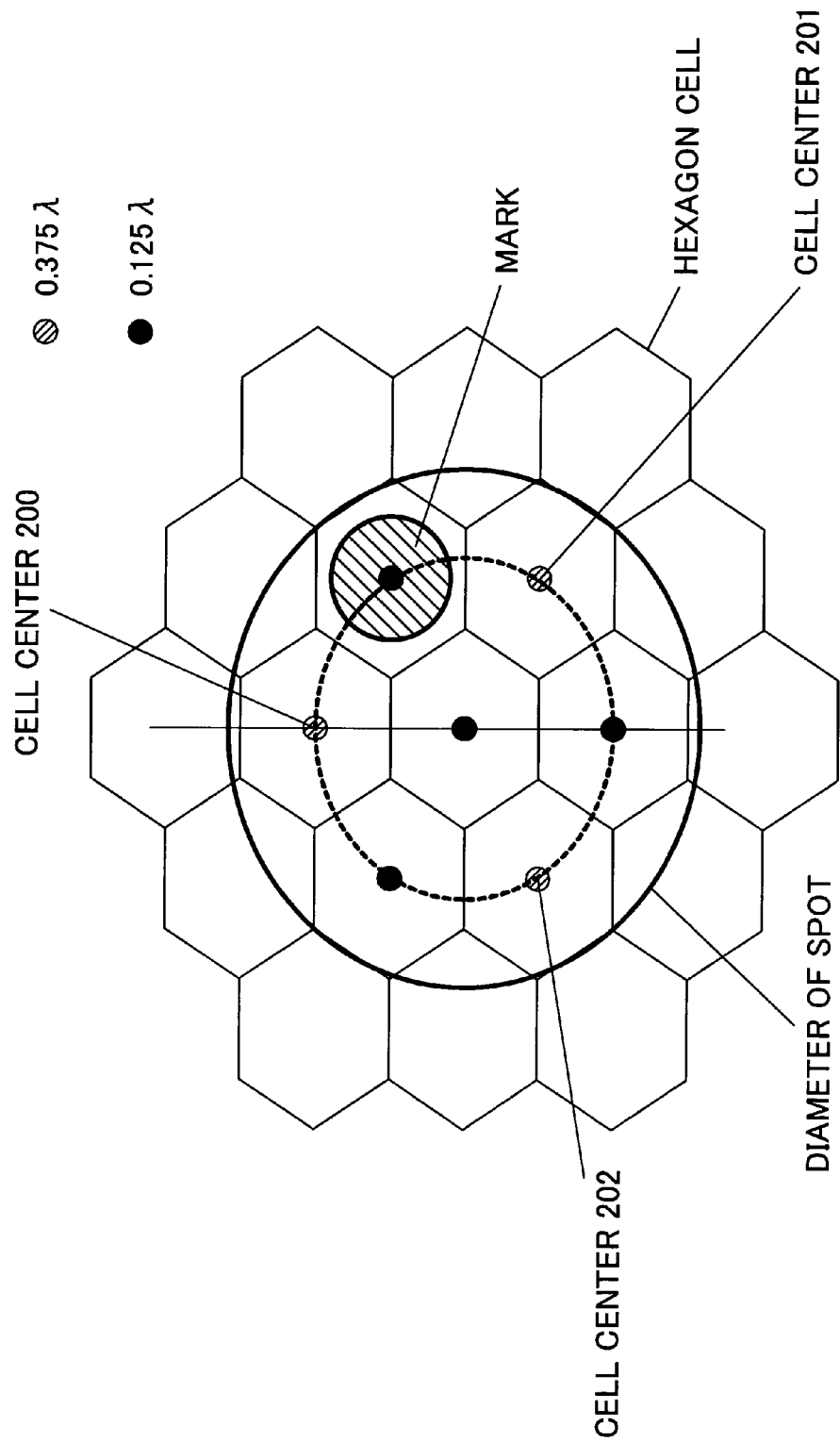
FIG. 4 is an explanatory view useful for explaining a structure of an ROM type disk.
Figure 5:
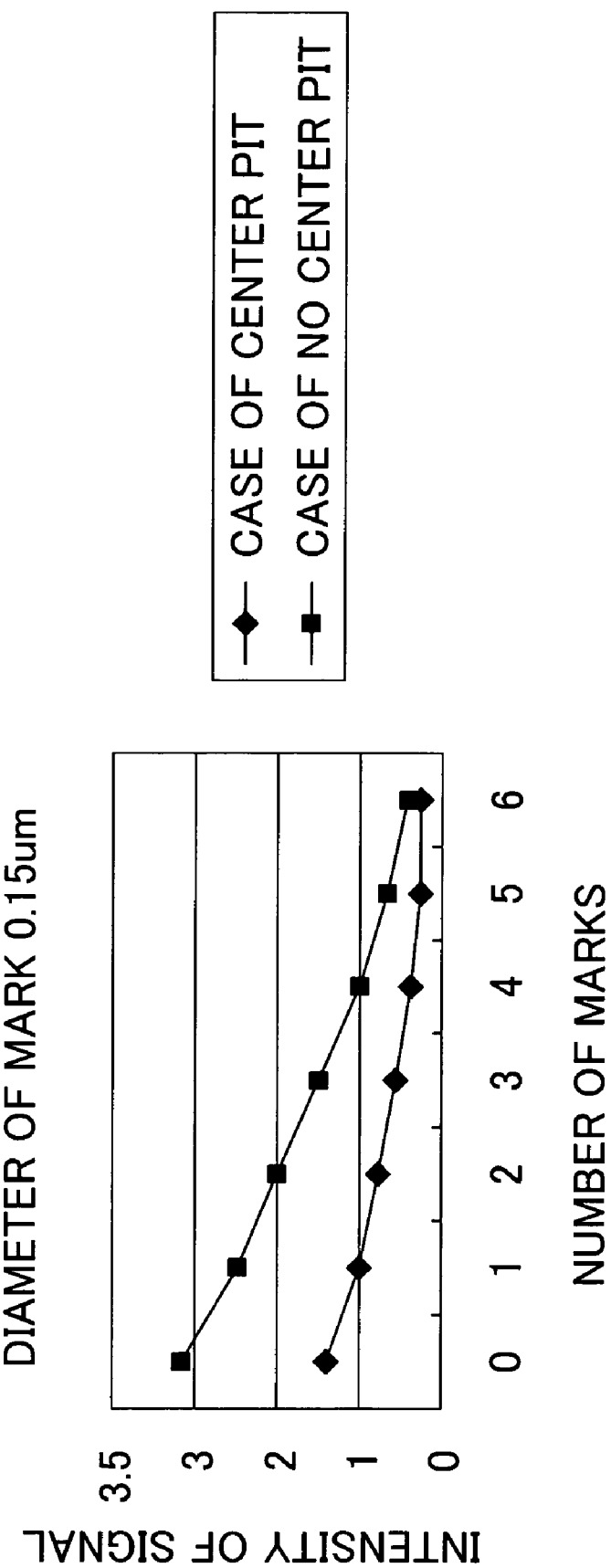
FIG. 5 is a graph useful for explaining a readout signal from an ROM disk of a conventional type.

An embodiment when the invention is applied to an ROM will be explained. In an ROM type disk according to the conventional art, hexagon cells are packed to a disk front surface as shown in FIG. 4 and a pit having a perfect circle shape is arranged at the center of the hexagon cell. Seven cells exist inside a spot and a level of a readout signal can be changed depending on the absence/existence of the seven pits. In the ROM disk according to the conventional art, the depth of each pit is constant. To increase signal intensity, the depth is selected to be a 1/4 wavelength in a reflection type, or a value $\pi$ when expressed by an optical phase change amount. FIG. 5 shows the change of the readout signal at this time relative to the increase of the number of pits. The graph shows dividedly the case where the pit exists at the center and the case where it does not. In each case, the sequence of the increase of the pit starts from the cell center 200 and the pit is serially put into each cell center in a clockwise direction. FIG. 5 shows the result. The signal change of quantity relative to the increase of the number of pits decreases when the number of pits increases. Particularly when the center pit exists, the readout signal does not change even when the number of pits changes to 4, 5 and 6. A numerical aperture of an objective lens is 0.85 and a wavelength is 405 nm as the readout condition.

Figure 7:
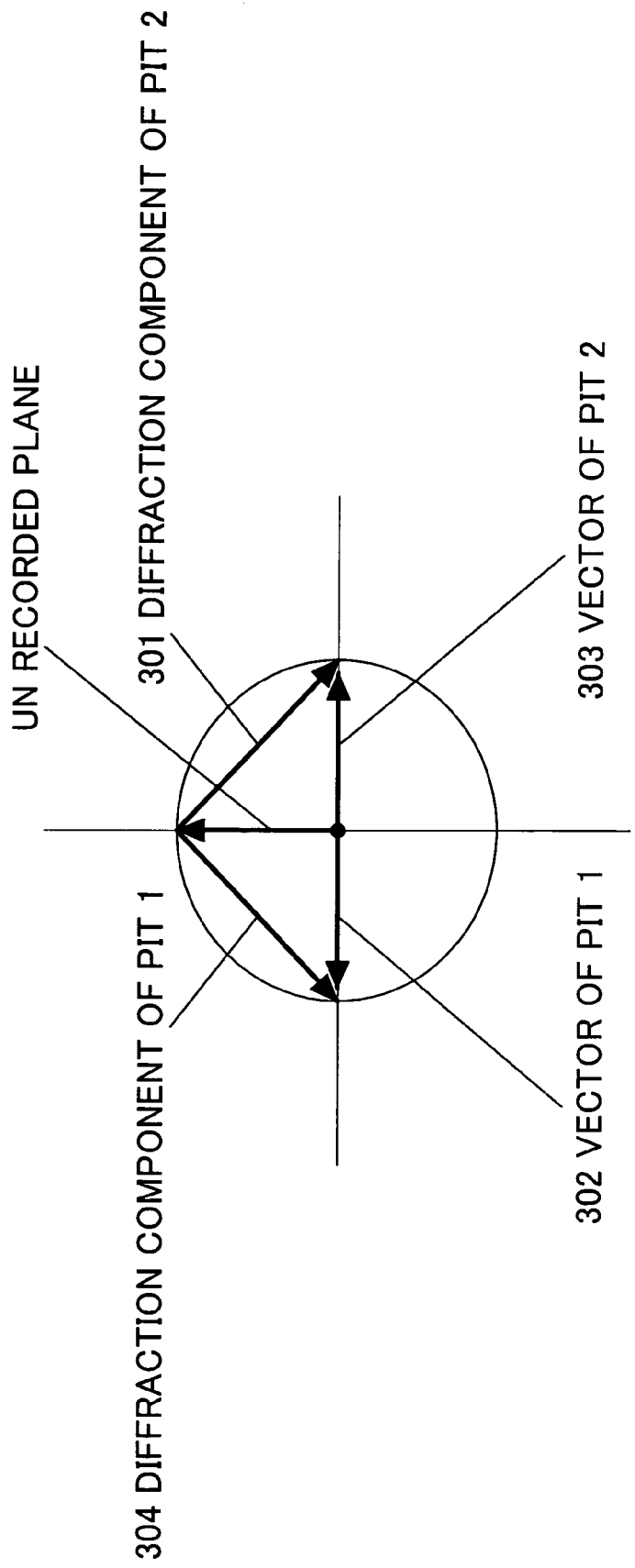
FIG. 7 is an explanatory view useful for explaining diffracted light vectors from pits of an ROM type disk.

Referring to FIG. 7, because amplitude of reflectivity of the mark portions is 1 in the case of the ROM, diffraction components intersecting each other are assumed to be components 304 and 301, respectively. Then, the vectors of the pits 1 and 2 that are determined by diffracted light orthogonally intersecting each other are the pits 302 and 303, respectively. The optical phase quantity of the pit 1 is $3/2\pi$ and that of the pit 2, $1/2\pi$. The amplitude of reflectivity is 1. The mode for carrying out the invention may be the following two, i.e. a reflective type and a transmission type. Because the reflective type has been predominant in the optical disks at present, this embodiment represents the reflective type by way of example. Because light reciprocates once inside the pit, an optical path length is expressed as $2 \cdot n \cdot h$ where h is a physical depth of the pit and n is a refractive index inside the pit. The optical phase difference resulting from the pit in reflected light in this case is expressed as 2·n·h·(2π/λ) (where λ is a wavelength) because one wavelength component corresponds to the phase difference 2π in the change of the optical path length. In other words, the optical phase quantity φ and the optical path length L have the following relation:

φ=2πL/λ  (12)

Figure 6:
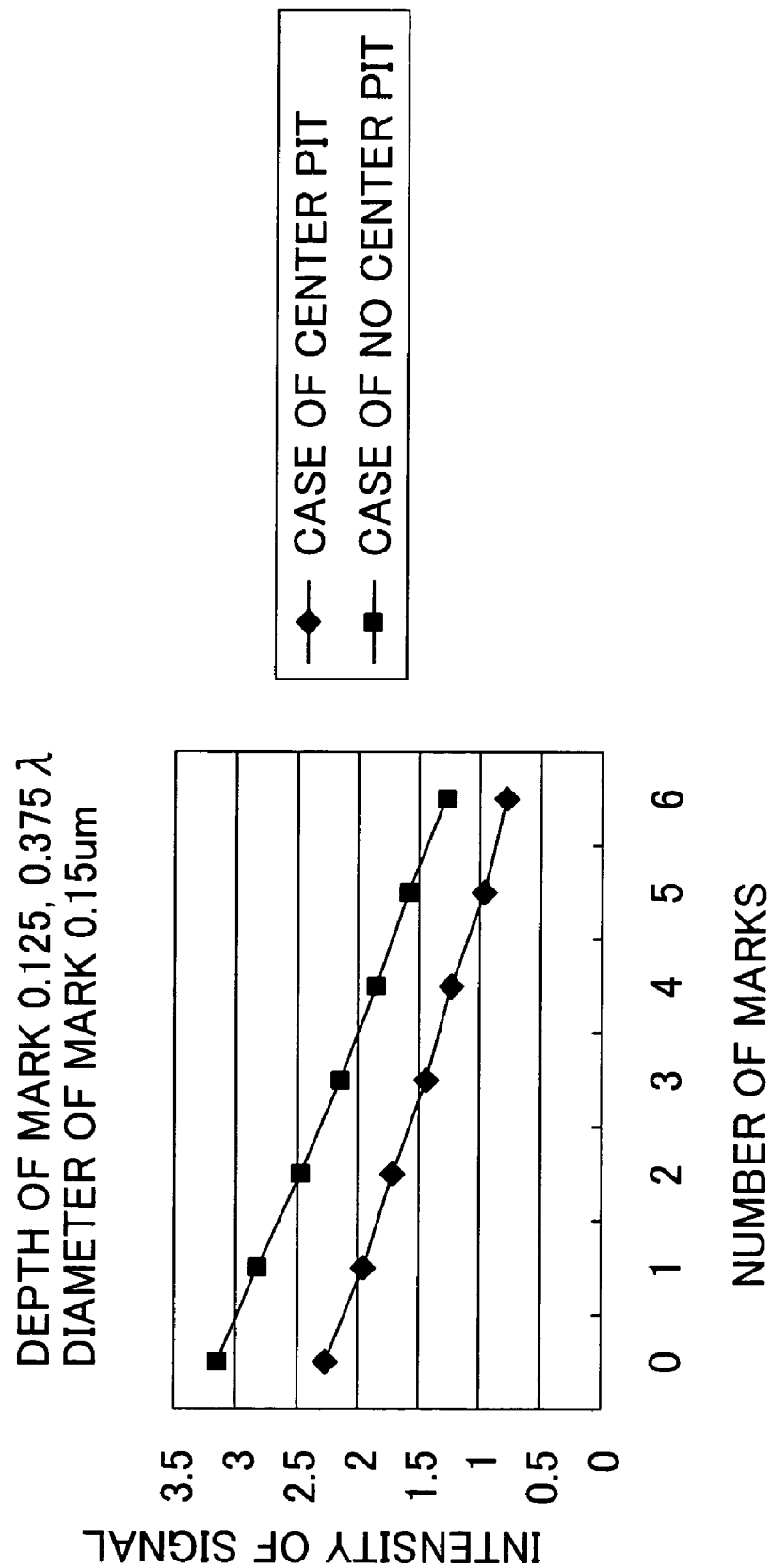
FIG. 6 is a graph useful for explaining a readout signal from an ROM disk of the invention.

In the ROM type disk according to this invention, the depth of the pits entering the cell centers 200, 201 and 202 is set to 1/2π of the optical phase difference and the depth of other pits, to 3/2π as shown in FIG. 4. In the reflective type disk, the physical depth of the pits is set to 1/8n wavelength and 3/8n wavelength (where n is a refractive index inside the pit). FIG. 6 shows the readout signals at this time with the proviso that n=1 in the drawing. When the increase of the number of pits is considered dividedly about the existence and the absence of the center pits, the change of quantity of the signals with respect to the increase of the marks becomes equal in either case and linearity can be accomplished. This is because the difference resulting from the existence and absence of the center pit has characteristics such that the spot distribution has high intensity at the center and decreases towards the periphery.

Embodiment 2

Figure 11A:
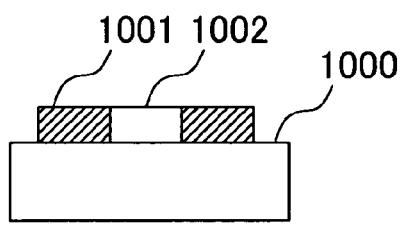
FIGS. 11A to 11G are schematic views each showing a fabrication step of an ROM type optical disk.
Figure 11E:
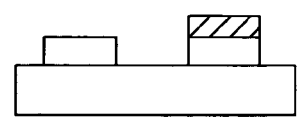
Figure 11B:
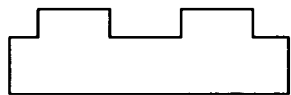

To accomplish the medium of Embodiment 1, it is necessary to fabricate two kinds of pits having mutually different depths. A fabrication method will be explained with reference to FIGS. 11A to 11G. A resist is applied onto a glass substrate 1000. Laser beams are irradiated and portions at which marks are to be formed are exposed as represented by an oblique line portion 1001. The rest of portions 1002 are left as shown in FIG. 11A. The resist is developed and the portions 1002 are removed. Etching is conducted with the exposed portion 1001 as a mask and the exposed portion 1001 is thereafter left in the same way as in an ordinary semiconductor process as shown in FIG. 11B.

Figure 11F:
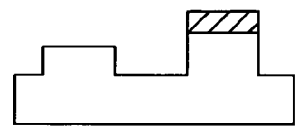
Figure 11C:
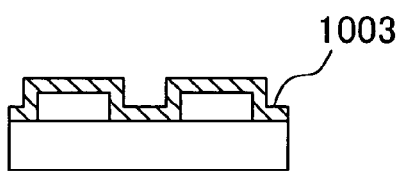
Figure 11G:
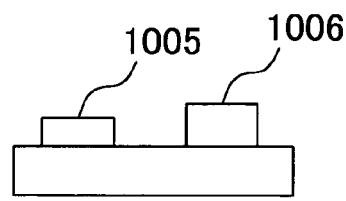
Figure 11D:
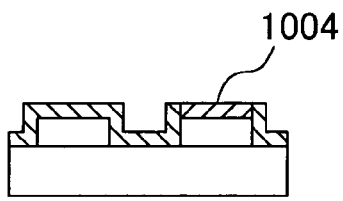

Next, a phase change layer film 1003 is sputtered as shown in FIG. 11C and only a specific portion 1004 is thermally recorded and is allowed to change to an amorphous state as shown in FIG. 11D. The crystal other than the amorphous portion is thereafter removed by a chemical processing to a state shown in FIG. 11E. Selective etching is conducted with the amorphous portion as the mask and two convex portions having mutually different height are formed as shown in FIG. 11F. When the amorphous portion is removed, two convex portions 1005 and 1006 having mutually different heights are formed. Since a master disk is thus formed, process steps similar to those of an ordinary ROM forming process may be followed. In other words, nickel plating is applied to the master disk and a stamper is produced. A plastic is molded with the stamper as the mold. In consequence, pits having different depths are formed at positions corresponding to the convex portions 1005 and 1006. Though this process illustrates the example of the pits, grooves having different depths, in which the convex portions described above continue in a disk circumferential direction, can be formed similarly.

Embodiment 3

Figure 1:
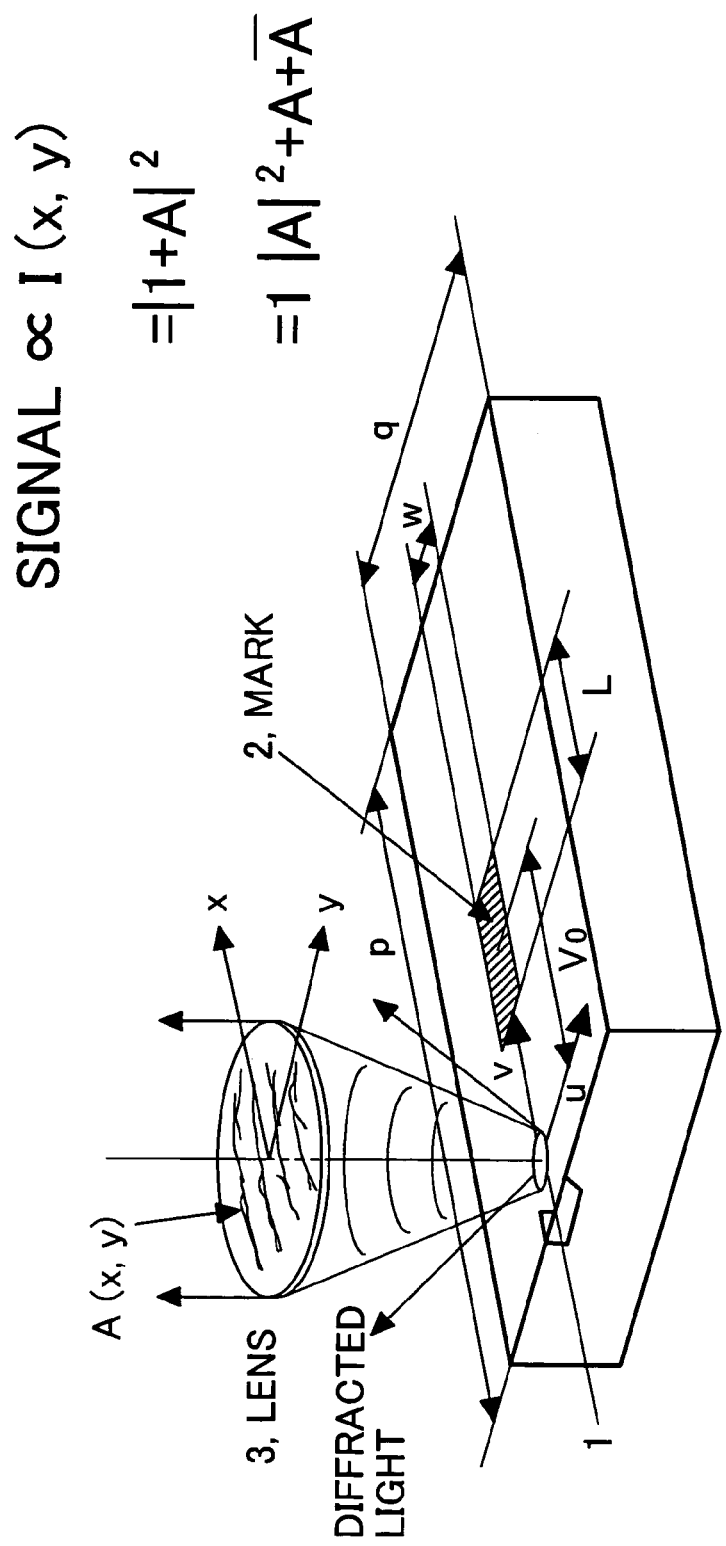
FIG. 1 is an explanatory view useful for explaining a readout operation from an isolated mark of an optical disk.
Figure 2:
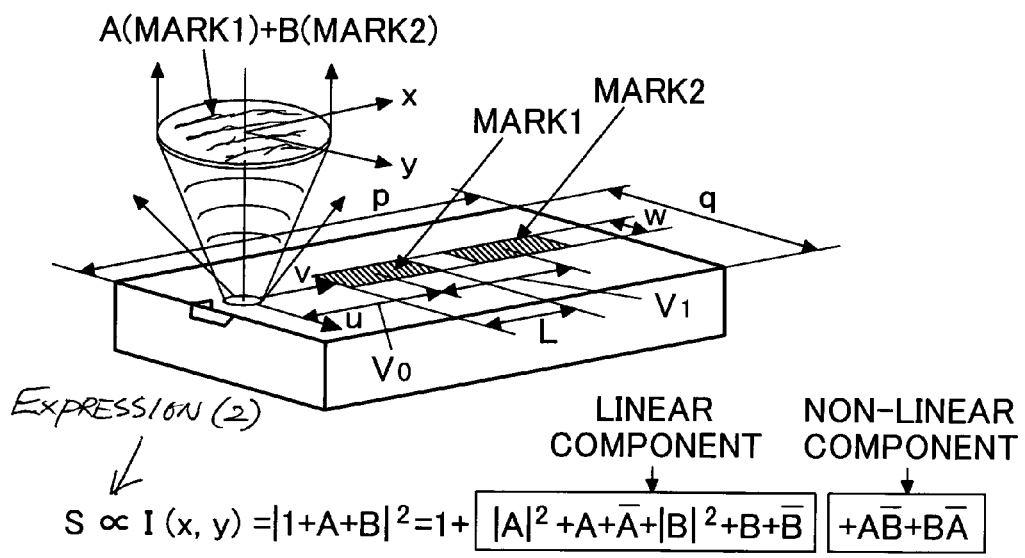
FIG. 2 is an explanatory view useful for explaining a readout operation from two marks of the optical disk.
Figure 3:
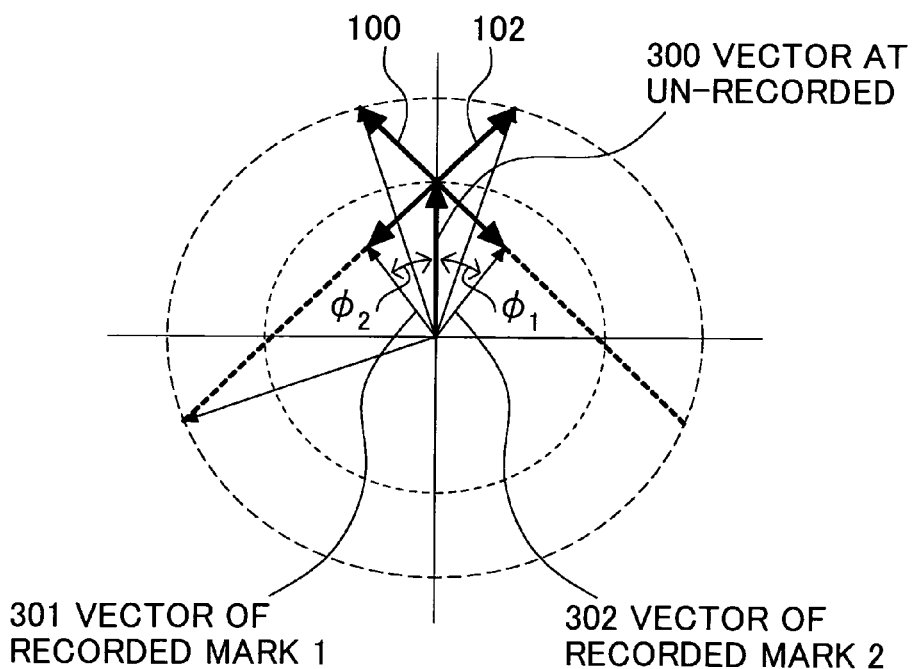
FIG. 3 is an explanatory view useful for explaining a condition in which diffracted light from marks becomes mutually orthogonal.

Next, an embodiment of a recording type optical disk will be described. It would be desirable if the condition in FIG. 3 in which the vectors representing diffracted light of different marks orthogonally intersect one another is accomplished in the recording type, too. In the recording type optical disk, a structure optically different from the non-recorded surface is disposed on the track so that the recorded spots can be guided to the track. As one of such structures, the track is formed by a groove having a predetermined depth. Diffracted light from the recorded mark is allowed to establish the orthogonal relation represented by the expressions (4) and (5) by combining this depth with the optical characteristics of the mark to be recorded on the former.

Figure 8:
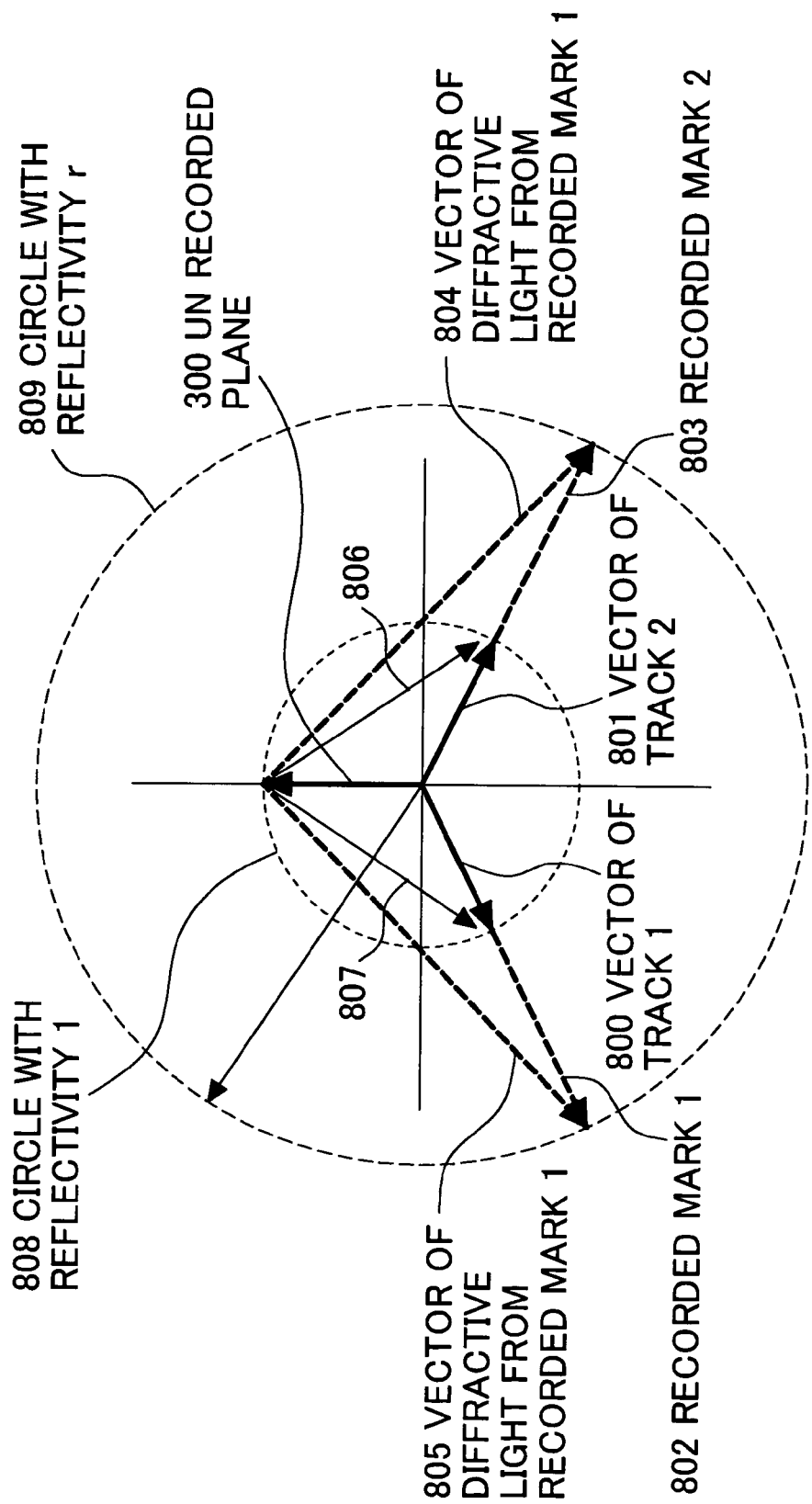
FIG. 8 is an explanatory view useful for explaining diffracted light vectors from recorded marks of a recording type optical disk.
Figure 9:
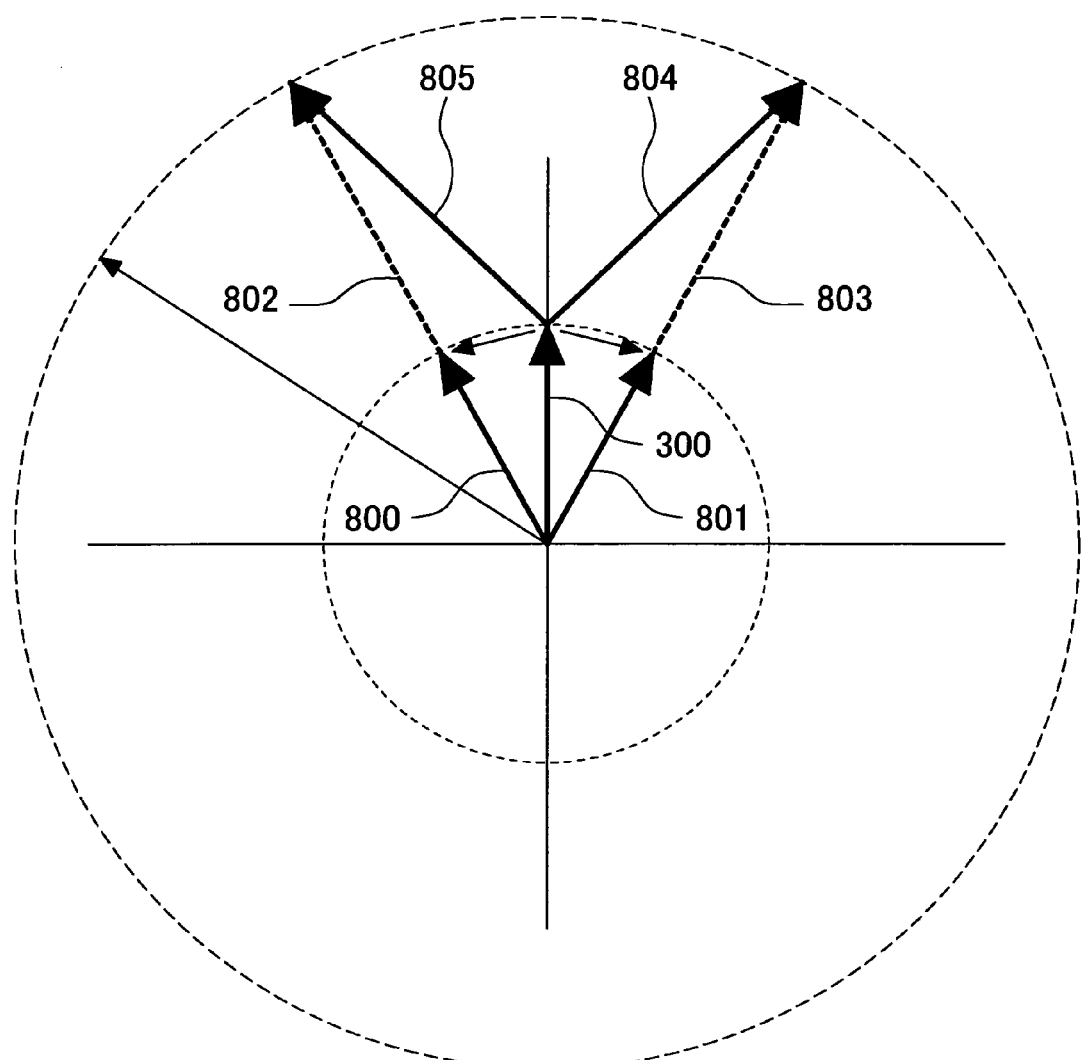
FIG. 9 is an explanatory view useful for explaining diffracted light vectors from recorded marks of another recording type optical disk.

As an example, the vector of each groove is selected as vectors 800 and 801 as shown in FIG. 8. The size of the vectors is set to be equal and the size of vectors 806 and 807 of diffracted light from the groove is set to be equal, too. Here, the circle with reflectivity denotes the numeral number of 808 and the circle with reflectivity r denotes the numeral number of 809. And a reference numeral 802 is a recorded mark1, 803 is a recorded mark2, 804 is a vector of diffractive light from the recorded mark2, and 805 is a vector of diffractive light from the recorded mark1. The phase differences of the grooves are selected to be φ1 and φ2 in such a fashion as to satisfy the expression (4). The recording layer is disposed on the groove and the relative amplitude of reflectivity of the recording mark by recording is selected to be greater than that of the non-recorded part as shown in the drawing and to satisfy the expression (5). On the other hand, FIG. 9 shows diffracted light vectors of other recording type optical disks. In FIG. 9, the diffracted light vector faces upward with respect to the sheet of the drawing.

Figure 10:
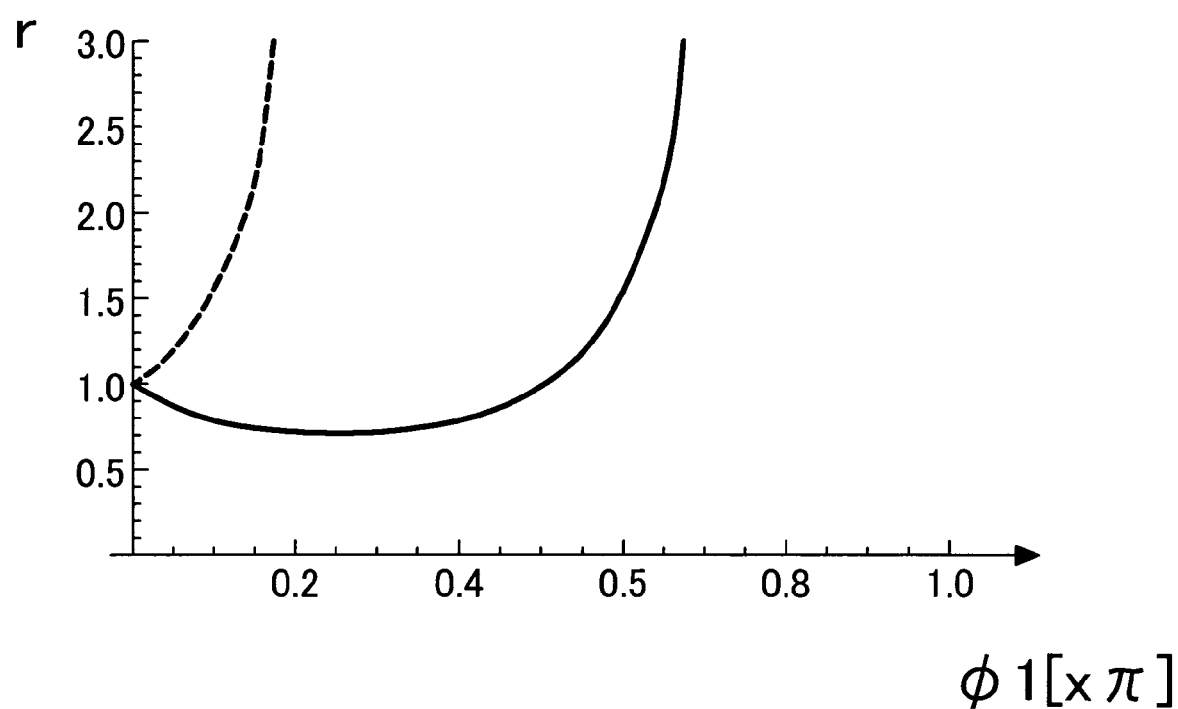
FIG. 10 is a graph useful for explaining a relation between amplitude of reflectivity and a phase difference $\phi1$.
Figure 13:
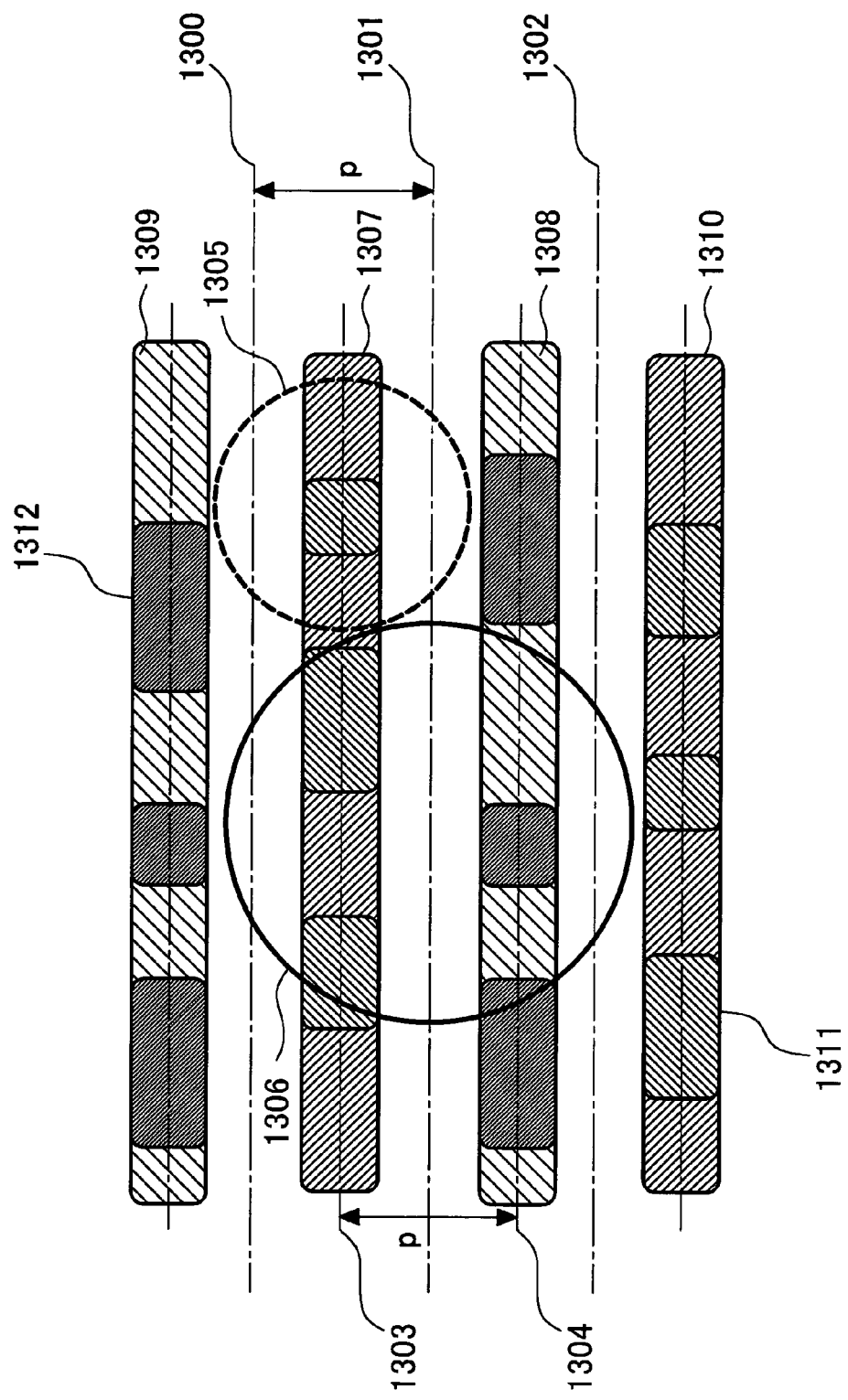
FIG. 13 shows a recording type optical disk according to another embodiment.

FIG. 10 shows the relation between the relative amplitude of reflectivity r and the phase difference φ1 that satisfies the condition of FIG. 8. Here, the condition of the dotted line is not the condition in which the diffracted light vector faces downward to the sheet of the drawing shown in FIG. 8 but is the condition in which it faces upward to the sheet of the drawing shown in FIG. 9. FIG. 13 shows a specific example. The phase difference of the grooves 1309 and 1308 is φ1 and the phase difference of the grooves 1307 and 1310 is φ2. Reflectivity of the marks 1312 and 1311 recorded on the grooves is r. The interval p between the groove centers 1303 and 1304 is about a half of the read spot 1306 much larger than the read spot 1305. Since the beam is simultaneously irradiated to the two tracks, the spot simultaneously reads out the information recorded on the grooves 1308 and 1307. Here, reference numerals 1300, 1301 and 1302 are land centers. When the phase difference and the reflectivity are selected as described above, the detection signal of the read spot 1306 is the sum of the signals recorded on the grooves 1308 and 1307. Therefore, as described with reference to the ROM type disk of Embodiment 4, the signals recorded on the respective grooves can be separated and detected by imparting the orthogonal relation between the phases of the signals recorded on the grooves 1308 and 1307.

Figure 16:
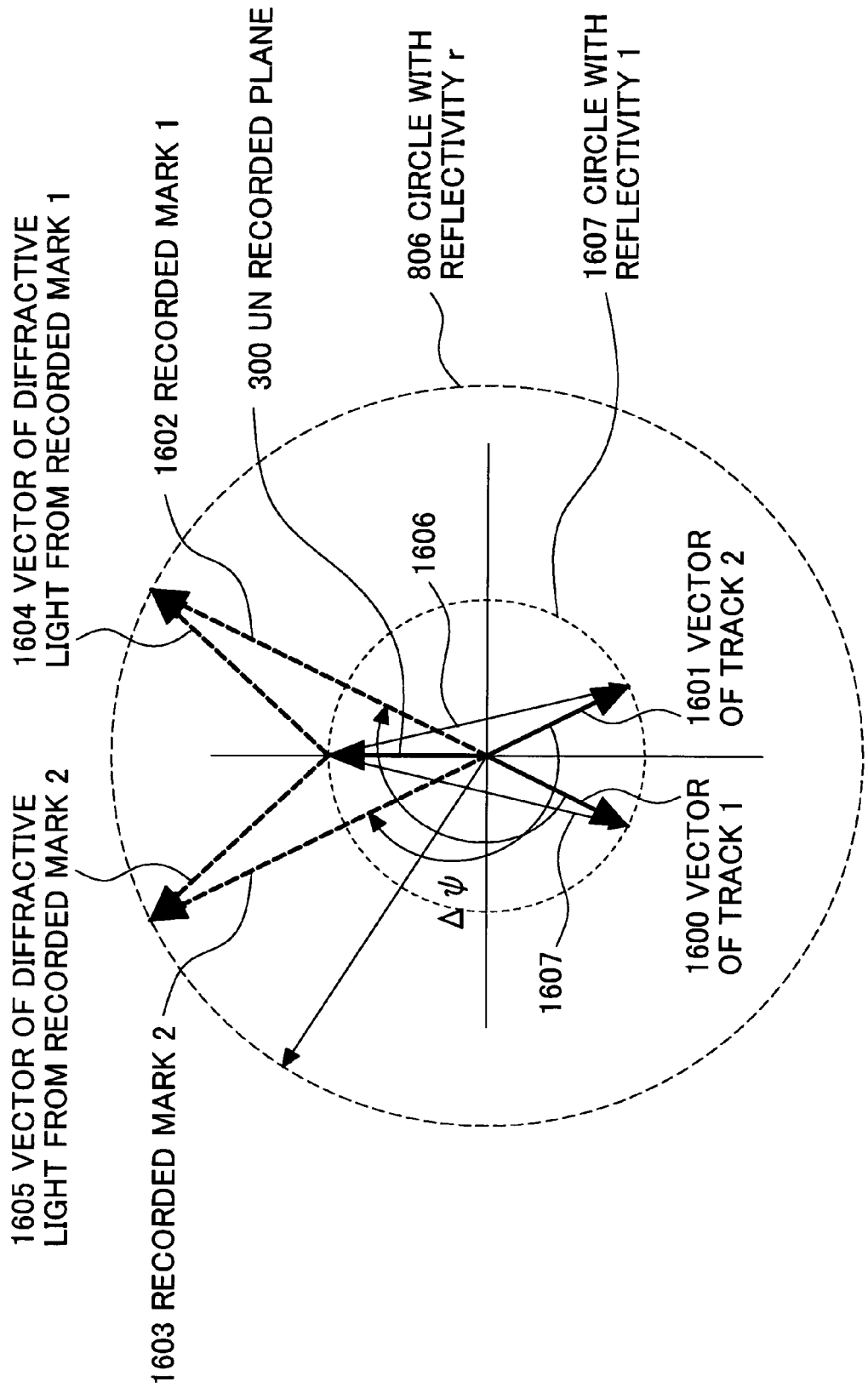
FIG. 16 shows a rewritable type optical disk according to still another embodiment.
Figure 17:
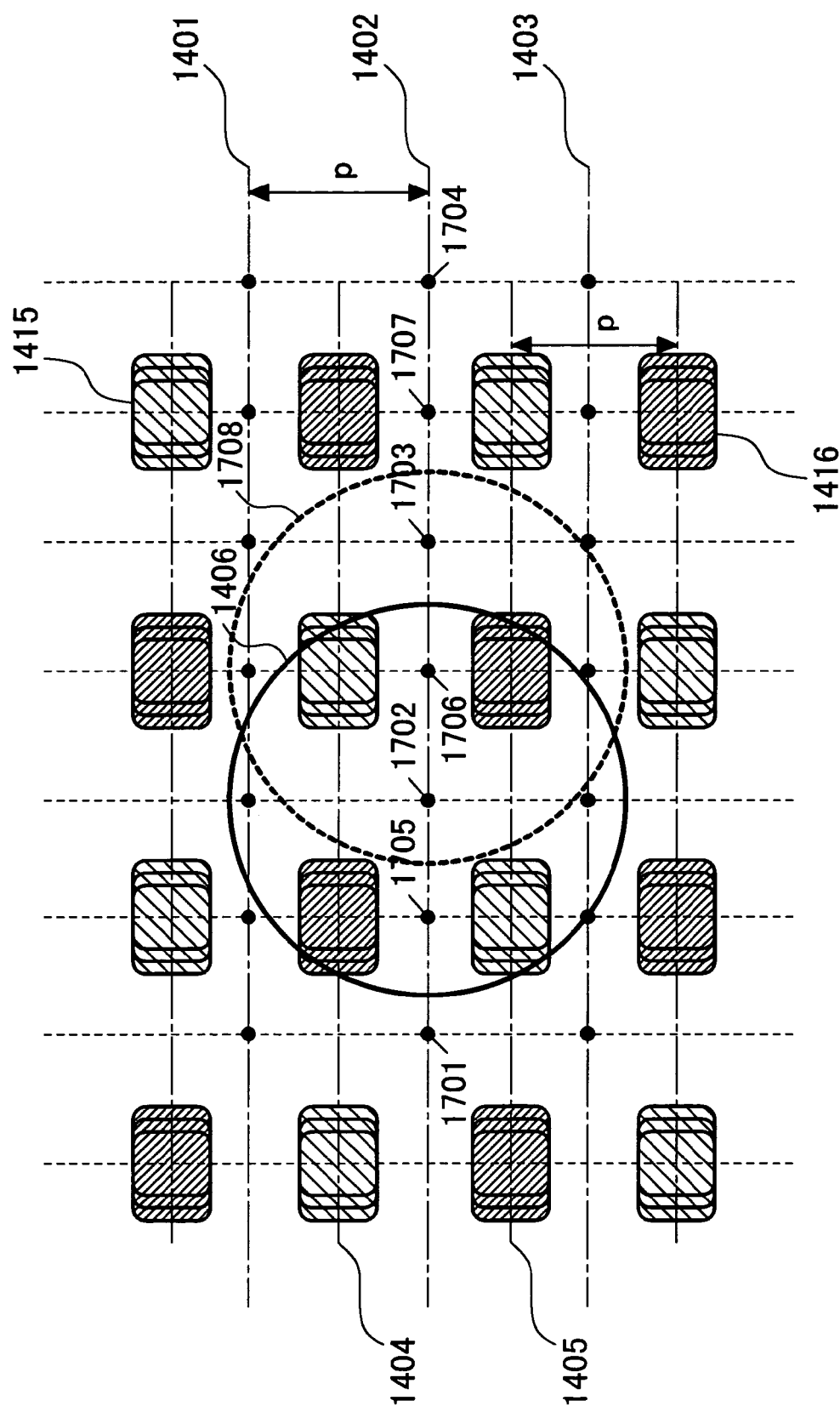
FIG. 17 shows an ROM type optical disk according to still another embodiment.

Further, another embodiment of a rewritable type optical disk will be explained with reference to FIG. 16. When a phase change medium is used for the recording medium, the reflectivity and the phase as the optical characteristics of the recording mark can be freely changed. When the phase differences of the adjacent tracks 1 and 2 are φ1 and φ2, respectively, the vectors representing the tracks are a vector 1600 and a vector 1601. The diffracted light vectors of the respective tracks are a vector 1607 and a vector 1606. When the mark is recorded on the groove and the phase difference of the mark is Δφ, the vector of the recording mark is vectors of from 1601 to 1603 in the track 1 and vectors of from 1600 to 1602 in the track 2. The phase differences are φ1+Δφ and φ2+Δφ, respectively.

Therefore, when φ1+Δφ=φ1 and φ2+Δφ=φ2 are set and the phase differences and the reflectivity are so set as to satisfy the expressions (5) and (6) of the orthogonal condition, the diffracted light vectors of the mark recorded between the adjacent tracks orthogonally intersect as vectors 1604 and 1605 and linearity is established. From the condition for making diffracted light from the recorded marks equal to each other and from the orthogonal condition, Δφ must be πN (N: odd number). When the expression (6) as the condition for accomplishing linearity in this embodiment is modified, the phase differences φ1 and φ2 of the tracks 1 and 2 and the relative reflectivity r of the recording mark must satisfy the following expression:

$$\phi 1+\phi 2=2\pi M \text{ (}M\text{: an integer)} \tag{13}$$

$$\Delta\phi=\pi N \text{ (}N\text{: an odd number)} \tag{14}$$

$$1+2\cdot r\cdot\cos(\phi 1)+r^2\cdot\cos(2\cdot\phi 1)=0 \tag{15}$$

Embodiment 4

Figure 12:
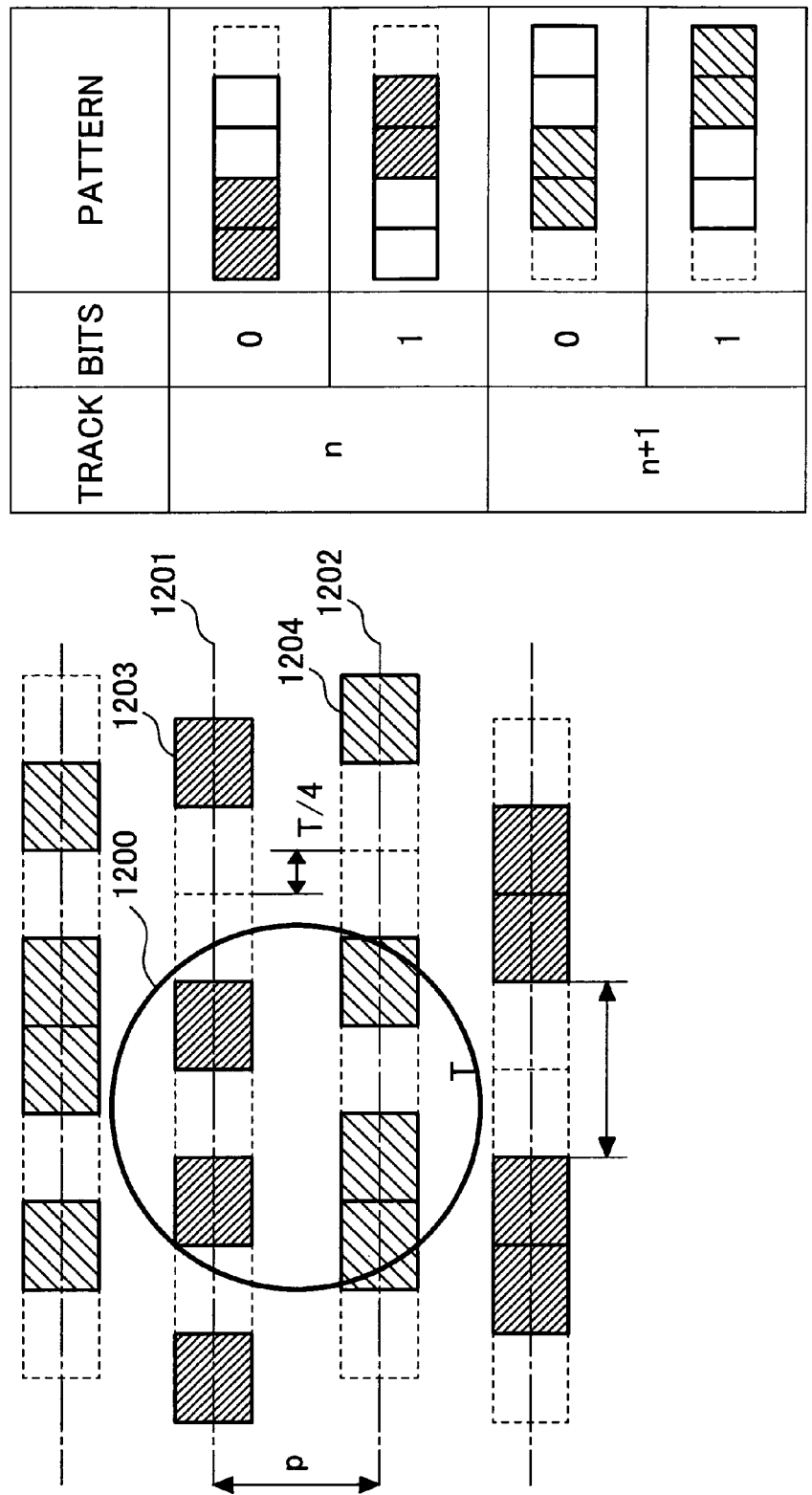
FIG. 12 shows an ROM type optical disk according an embodiment.

Next, an example capable of accomplishing a large capacity by using linearity characteristics in the ROM type optical disk will be explained. In FIG. 12, the information marks are aligned on the disk surface in the circumferential direction of the tracks 1201 and 1202. The depths of the concavo-convexity of the information marks of the tracks 1201 and 1202 are λ/4 and 3λ/4 (where λ is a wavelength of the light source) of the optical phase difference. The track pitch p is set so that the tracks 1201 and 1202 are simultaneously positioned inside the readout spot 1200. The track pitch is smaller than the spot diameter. In the optical disks according to the conventional art, the track pitch is selected unavoidably to be substantially equal to the spot diameter so that the spot does not expand to the adjacent tracks to avoid the influences of cross-talk and the track density becomes as high as possible. In this embodiment, however, the track pitch is smaller than the spot diameter and two tracks are simultaneously read out at one time. Because the depths of the concavo-convexity of the information marks 1203 and 1204 of the tracks 1201 and 1202 are λ/4 and 3λ/4 (where λ is the wavelength of the light source) of the optical phase difference, diffracted light from the information marks of the tracks 1201 and 1202 orthogonally intersect each other. When the rays of light passing through the objective lens are received by a photo-detector and are converted to electric signals, the electric signals are the simple addition of the signal S1 from the track 1201 and the signal S2 from the track 1202. To independently take out the signals S1 and S2 from the detection signal as the sum of these signals S1 and S2, a circuit construction is used in advance so that the signals S1 and S2 have the orthogonal relation on the electric signal.

For example, the carrier of the signal S1 and the carrier of the signal S2 are selected so that their frequency is equal but their phases are deviated by 90 degrees from each other, the phase of the information bit "1" of the signal S1 is deviated by 180 degrees from the phase of the information bit "0", and the phase of the information bit "1" of the signal S2 is deviated by 180 degrees from the phase of the information bit "0", too. According to this arrangement, the carrier and the frequency of the signal S1 are equal to those of the signal S2, respectively, even when the signals S1 and S2 are added. When synchronous detection is made by using a signal, the phase of which is in synchronism by 0 or 180 degrees with the phase of the signal S1, only the signal S1 can be taken out. Similarly, when synchronous detection is made by using a signal, the phase of which is in synchronism by 0 or 180 degrees with the phase of the signal S2, only the signal S2 can be taken out. FIG. 12 shows a specific arrangement of the information marks. Square dotted lines represent the positions at which the information marks exist, and a correspondence table between the information bit and the information mark is shown on the right side of FIG. 12. Assuming that the length on the disk corresponding to the cycle of the carrier is T, the positions at which the information marks exist are deviated by T/4 between the tracks 1201 and 1202.

Embodiment 5

Figure 14:
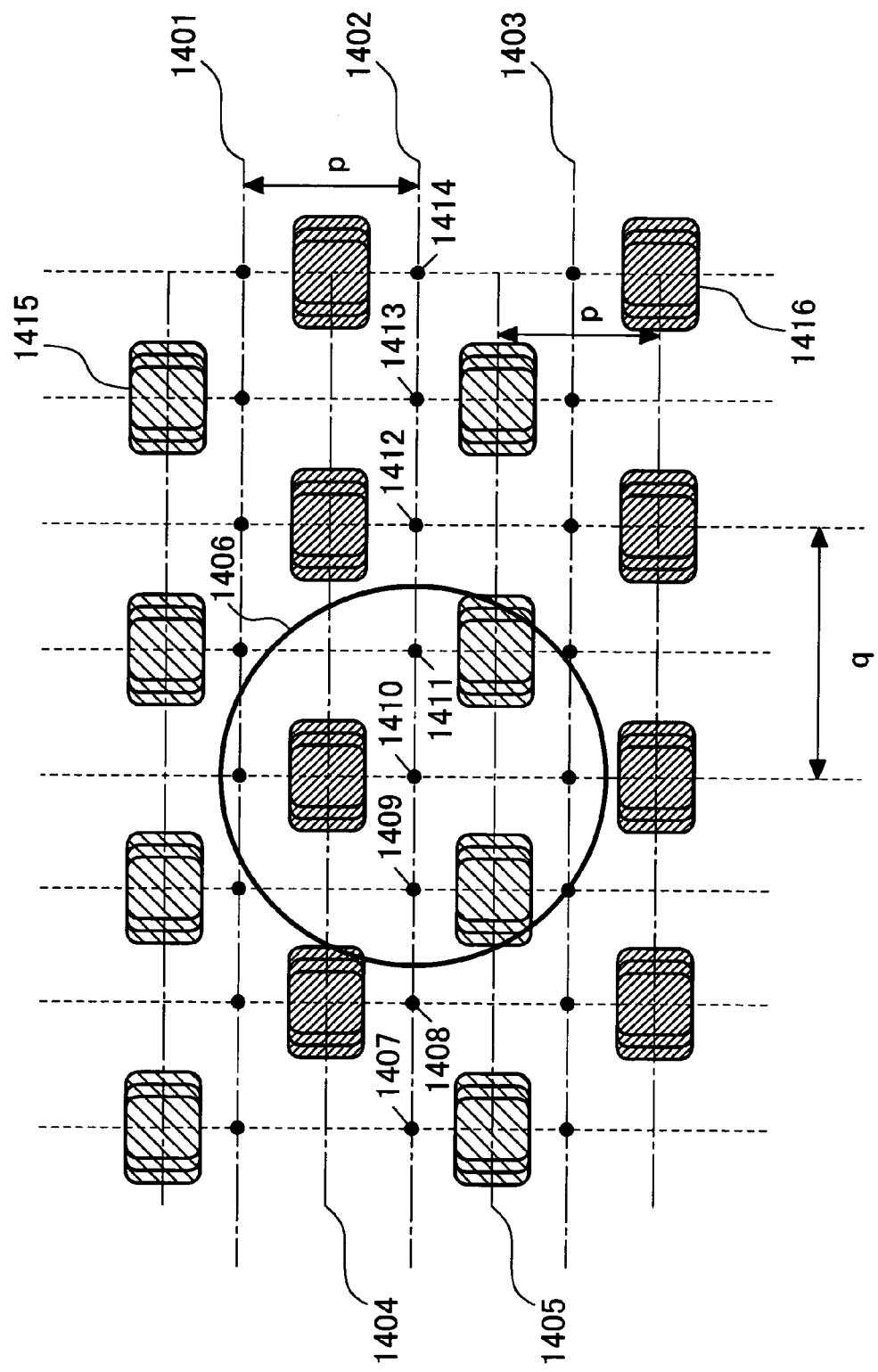
FIG. 14 shows an ROM type optical disk according to another embodiment.

Further, the ROM type optical disk according to still another embodiment will be explained with reference to FIG. 14. In this embodiment, the pits like 1415 and 1416 are arranged in the lattice form having a cycle q on the tracks having the track pitch p. However, the lattice points at which the pits of the adjacent tracks 1405 and 1406 are positioned are deviated from each other by a half of the cycle q. The readout spot 1406 moves on the center lines 1401, 1402 and 1403 between the two tracks and the signals are read out at the lattice points 1407, 1408, 1409, 1410, 1411, 1412, 1413 and 1414 in the half cycle of the cycle q. Then, three pits exist inside the readout spot 1406 at each readout point. Here, the area of each pit is changed by changing the length of the pit while the pit width is kept fixed and the signal detected from the spot 1406 is changed through the combination of the changes of the areas of the three spots. Whereas the shape of the pit is kept fixed and the signal level detected by the spot is changed from the number falling within the spot in the foregoing Embodiment 1, the number of pits is kept fixed and the area of each pit is changed in this embodiment. When the phase differences of the pits falling within the spot 1406 are equal, linearity between the change of the pit shape and the signal level detected by the spot disappears in this embodiment, too. Assuming therefore that the phase depth of the pit row on the track center 1404 is φ1 and the phase depth of the pit row on the track center 1405 is φ2, linearity can be established between the detection signal of the spot 1406 and the area of each pit at each detection lattice point. In this embodiment, each pit changes its length in three ways at each edge and the area changes in nine ways for each pit. When three pits exist, there are 27 combinations of pit areas. When overlap is taken into account, however, the multi-value level that the three pits can assume is 9.

In this embodiment, three marks are put into one spot 1406 and readout is made in each half cycle of the pit cycle. The lattice points at which the pits of the tracks 1404 and 1405 are arranged are brought into conformity in the track circumferential direction and the signals are detected at the readout lattice points 1701 to 1707. Then, there are the case where 4 pits exist inside the spot 1708 and the case where 2 pits exist. When linearity is used in the case of the two pits, however, the signals can be determined by using the signal detected at the lattice point 1706, for example. In the case of the four pits, the signals from the remaining 2 pits can be determined from the signal detected at the point 702, for example. In other words, the signal in the case of the two pits is multiplied by a coefficient for correcting the spot intensity and is subtracted from the detection signal in the case of the four pits. In this system, all the adjacent pits at the time of detection can accomplish the complete orthogonal relation. Therefore, the track pitch and the mark pit become narrow and linearity can be maintained even when a greater number of pits enter the spot.

Embodiment 6

Figure 15:
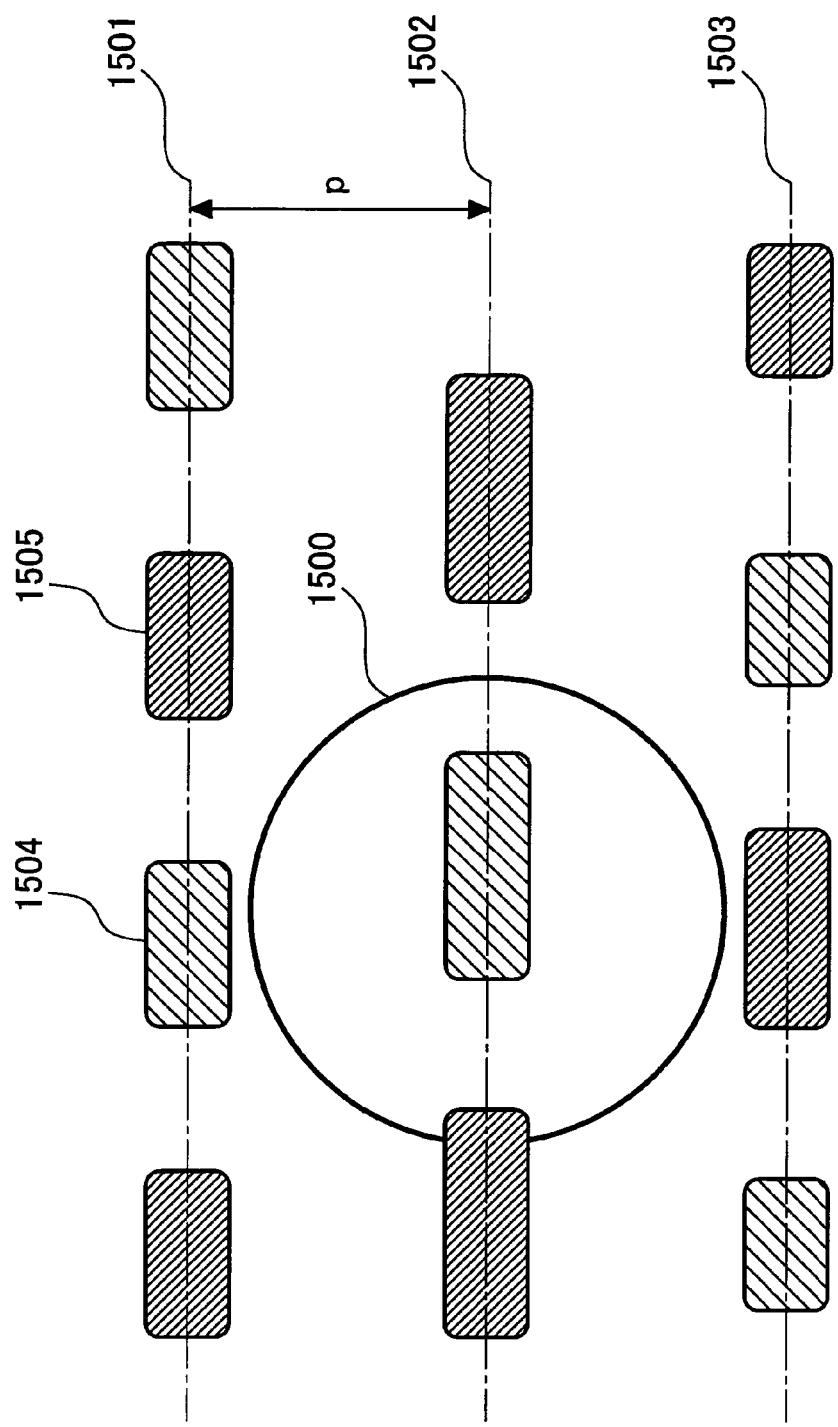
FIG. 15 shows an ROM type optical disk according to another embodiment.

Another ROM type disk will be explained with reference to FIG. 15. In this embodiment, the invention is applied to the readout method of the optical disk of the conventional art, that is, the optical disk having the structure in which one track 1502 exists inside the spot 1500 and the spot 1500 hardly touches the adjacent tracks 1501 and 1503. Here, the phase differences of the adjacent pits are changed to $\phi 1$ and $\phi 2$. In other words, the vectors of the pits 1504 and 1505 are the vectors 302 and 303 shown in FIG. 7, respectively. According to this arrangement, the diffracted light vectors 300 and 301 of the pits 1504 and 1505 have equal amplitude and orthogonally intersect each other. Therefore, the readout signal amplitude from the pits is equal and establishes linearity and a customary signal processing such as equalization can be conducted easily. Furthermore, a customary method of detecting the edge position of the pit through slice of the readout signal that has been used in the past can be applied, too.

Embodiment 7

Figure 18A:
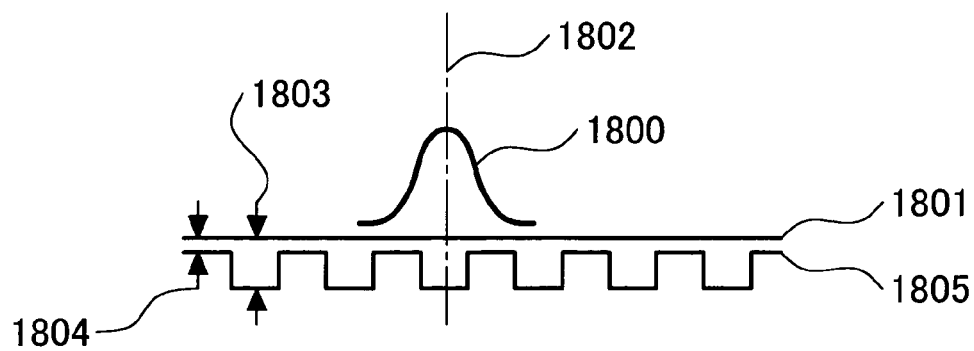
FIGS. 18A to 18C show a rewritable type optical disk according to still another embodiment.
Figure 18B:
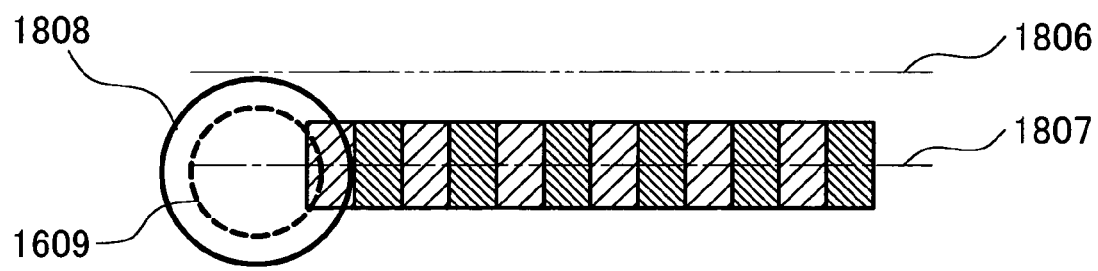
Figure 18C:
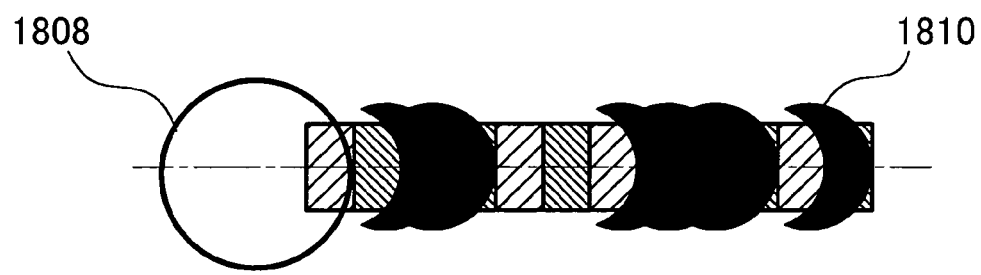

Still another embodiment of the re-writable type optical disk will be explained with reference to FIG. 18. FIG. 18A is a sectional view of the track having a track center 1807 in the direction of the depth. A reference numeral 1806 is a track center adjacent to track center 1807. The optical disk has a cyclic structure 1805 of the concavo-convexities having depths 1803 and 1804 corresponding to the phase differences $\phi 1$ and $\phi 2$. A chevron type mark 1809 having a relative reflectivity r is recorded on the track in synchronism with the concave and the convex. The mark is read out at the spot 1808. In this embodiment, substantially one track exists inside the spot. When recording is made by the mark edge recording system, it is preferred to set the length of the concave or the convex to the physical length of the detection window of the modulation code. The radius of curvature of the chevron mark 1809 is determined by the diameter 1810 having a sharp inclination 1609 of the intensity distribution 1800 of the spot 1808. Here, a reference numeral 1802 is a center of the intensity distribution. A medium capable of over-write is selected for the recording medium at this time. A phase change medium is preferably selected. When the mark and the depths of the concavo-convexities satisfy the relations (13), (14) and (15), the recorded mark exhibits linear characteristics and even when the mark length varies, response of each detection window width becomes equal without depending on the mark length.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. An information playback method for reading out information by irradiating an optical spot on an information recording medium having a plurality of tracks, said method comprising the steps of:
    irradiating said optical spot simultaneously on a first track and a second track adjacent to said first track, among said plurality of tracks; and
    maintaining an orthogonal relation with a depth of a recorded mark recorded on said first track and a depth of a recorded mark recorded on said second track, when both the recorded marks are converted to electric signals,
    wherein when a readout signal from said first track is S1 and a readout signal from said second track is S2, frequencies of carrier waves of said S1 and said S2 are equal frequency but both phases are deviated by 90 degrees from each other, information bits "1" and "0" of said S1 are deviated by 180 degrees in phases, and information bits "1" and "0" of said S2 are deviated by 180 degrees in phases.

2. An information playback method as defined in claim 1 wherein the maintaining step maintains the orthogonal relation when simultaneously converting both the recorded marks to electric signals thereby direct adding the signals to read out information therefrom, and wherein the depth of the recorded mark recorded on said first track is different from the depth of the recorded mark recorded on said second track.

3. An information playback method as defined in claim 1, wherein bit pattern positions of said first and second tracks are deviate by T/4, where T is a length on said track corresponding to a cycle of said carrier wave.

* * * * *